United States Patent
Matsuda et al.

(10) Patent No.: US 10,179,384 B2
(45) Date of Patent: Jan. 15, 2019

(54) HOUSING OF ELECTRONIC COMPONENTS DETECTING DEPOSITED CUTTING FLUID AND MOTOR DRIVE SYSTEM INCLUDING HOUSING

(71) Applicant: FANUC CORPORATION, Yamanashi (JP)

(72) Inventors: Ryou Matsuda, Yamanashi (JP); Yasuyuki Matsumoto, Yamanashi (JP); Naoki Masuda, Yamanashi (JP); Kiichi Inaba, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/276,875

(22) Filed: Sep. 27, 2016

(65) Prior Publication Data

US 2017/0087681 A1  Mar. 30, 2017

(30) Foreign Application Priority Data

Sep. 30, 2015  (JP) ................................. 2015-193038

(51) Int. Cl.
| | |
|---|---|
| *B23Q 11/08* | (2006.01) |
| *B23Q 11/00* | (2006.01) |
| *B23Q 11/10* | (2006.01) |
| *B23Q 17/00* | (2006.01) |

(52) U.S. Cl.
CPC .......... *B23Q 11/08* (2013.01); *B23Q 11/0067* (2013.01); *B23Q 11/0085* (2013.01);
(Continued)

(58) Field of Classification Search
CPC . B23Q 11/08; B23Q 11/0067; B23Q 11/0085; B23Q 11/0089; B23Q 11/1084; B23Q 17/007; B23Q 2717/00
(Continued)

(56) References Cited

U.S. PATENT DOCUMENTS

| | | | | |
|---|---|---|---|---|
| 3,679,051 | A | * | 7/1972 | Larson ................. B01D 21/267 210/124 |
| 4,325,663 | A | * | 4/1982 | Lee ........................ B01D 21/00 137/205 |

(Continued)

FOREIGN PATENT DOCUMENTS

| | | |
|---|---|---|
| CN | 203563276 U | 4/2014 |
| CN | 203863428 U | 10/2014 |

(Continued)

OTHER PUBLICATIONS

English Abstract and Machine Translation for Japanese Publication No. 2015-145864 A published Aug. 13, 2015, 17 pgs.
(Continued)

*Primary Examiner* — Michelle Lopez
(74) *Attorney, Agent, or Firm* — Fredrikson & Byron, P.A.

(57) ABSTRACT

A motor drive system enabling detection of cutting fluid deposited at a housing of electronic components. A housing holding electronic components of a motor drive system has top faces slanted with respect to the horizontal plane so as to guide the deposited cutting fluid. The housing further includes storage parts collecting the cutting fluid guided along the top faces. The storage parts may be graduated so as to enable the collected amount of the cutting fluid to be measured. The storage parts may be configured to be detachable from the housing.

7 Claims, 2 Drawing Sheets

(52) U.S. Cl.
CPC .......... *B23Q 11/0089* (2013.01); *B23Q 11/10* (2013.01); *B23Q 11/1084* (2013.01); *B23Q 17/007* (2013.01); *B23Q 2717/00* (2013.01)

(58) Field of Classification Search
USPC ........................................................ 173/197
See application file for complete search history.

(56) References Cited

U.S. PATENT DOCUMENTS

| | | | |
|---|---|---|---|
| 4,609,126 A | 9/1986 | Janda | |
| 9,526,173 B2* | 12/2016 | Chou | ..................... H05K 1/181 |
| 2013/0229741 A1* | 9/2013 | Yuasa | .................. H02H 1/0038 |
| | | | 361/104 |

FOREIGN PATENT DOCUMENTS

| | | |
|---|---|---|
| CN | 104241977 A | 12/2014 |
| CN | 104820180 A | 8/2015 |
| CN | 206364637 U | 7/2017 |
| DE | 202008011844 U1 | 12/2008 |
| DE | 102013108305 A1 | 2/2014 |
| DE | 102013015791 A1 | 3/2014 |
| DE | 102014017161 A1 | 5/2015 |
| DE | 102015101178 A1 | 8/2015 |
| JP | 200619405 A | 1/2006 |
| JP | 201472211 A | 4/2014 |
| JP | 2015145864 A | 8/2015 |

OTHER PUBLICATIONS

English Abstract and Machine Translation for Japanese Publication No. 2014-072211 A published Apr. 21, 2014, 24 pgs.
Untranslated Notification of Reasons for Refusal mailed by Japan Patent Office (JPO) for Application No. JP 2015-193038, dated Nov. 1, 2016, 5 pages.
English machine translation of Decision to Grant a Patent mailed by JPO for Application No. JP 2015-193038, dated Nov. 1, 2016, 4 pages.
Untranslated Decision to Grant a Patent mailed by Japan Patent Office (JPO) for Application No. JP 2015-193038, dated Jan. 31, 2017, 3 pages.
English machine translation of Decision to Grant a Patent mailed by JPO for Application No. JP 2015-193038, dated Jan. 31, 2017, 3 pages.
English Machine Translation for Japanese Publication No. 2006-019405 A, published Jan. 19, 2006, 7 pgs.
English Abstract and Machine Translation for German Publication No. 102015101178 A1, published Aug. 6, 2015, 13 pgs.
English Abstract and Machine Translation for German Publication No. 102014017161 A1, published May 28, 2015, 10 pgs.
English Abstract and Machine Translation for German Publication No. 102013015791 A1, published Mar. 27, 2014, 16 pgs.
English Abstract and Machine Translation for German Publication No. 102013108305 A1, published Feb. 13, 2014, 7 pgs.
English Machine Translation for German Publication No. 202008011844 U1, published Dec. 18, 2008, 3 pgs.
English Abstract and Machine Translation for Chinese Publication No. 206364637 U, published Jul. 28, 2017, 6 pgs.
English Abstract and Machine Translation for Chinese Publication No. 203563276 U, published Apr. 23, 2014, 12 pgs.
English Abstract and Machine Translation for Chinese Publication No. 104820180 A, published Aug. 5, 2015, 11 pgs.
English Abstract and Machine Translation for Chinese Publication No. 104241977 A, published Dec. 24, 2014, 10 pgs.
English Abstract and Machine Translation for Chinese Publication No. 203863428 U, published Oct. 8, 2014, 6 pgs.

\* cited by examiner

HOUSING OF ELECTRONIC COMPONENTS DETECTING DEPOSITED CUTTING FLUID AND MOTOR DRIVE SYSTEM INCLUDING HOUSING

BACKGROUND OF THE INVENTION

1. Field of the Invention

The present invention relates to a housing holding electronic components and a motor drive system including that housing.

2. Description of the Related Art

A motor drive system for driving a machine tool is used in an environment in which dust, cutting fluid, and other foreign matter fills the air. The electronic components forming the motor drive system are housed in a control panel having the form of a locker and are protected from that foreign matter. However, in actuality, it is difficult to completely prevent foreign matter from entering the inside of the control panel.

If foreign matter sticks to the electronic components inside of the control panel, over the years, it will cause the electronic components to corrode and can cause the motor drive system to malfunction. Therefore, proposals have been made to prevent deposition of foreign matter or identify deposition of foreign matter early.

Japanese Patent Publication No. 2006-019405A discloses a printed circuit board including a circuit for detecting deterioration or malfunction of the printed circuit board occurring due to foreign matter, for example, dust or cutting fluid, deposited on the printed circuit board.

According to the related art, to prevent foreign matter from depositing on electronic components, a mechanism has been provided for guiding cutting fluid away from the housing of the electronic components or the electronic components have been arranged at locations resistant to deposition of cutting fluid. Alternatively, to prevent cutting fluid from filling the air, it has been proposed not to use a fan motor for cooling use.

SUMMARY OF THE INVENTION

According to the above-mentioned related art for protecting electronic components by a housing including a guide mechanism, an effect of prevention of deposition of cutting fluid can be expected to a certain extent. However, the cutting fluid moved away from the housing due to the guide mechanism drips down to the location where the motor drive system is installed, so it is difficult to obtain a grasp of the amount of cutting fluid entering the inside of the control panel. Therefore, a motor drive system designed to detect cutting fluid entering the inside of the control panel and prompt preventative measures to be taken before malfunctions of the motor drive system occur has been sought.

According to the present invention, there is provided a housing holding electronic components of a motor drive system for driving a machine tool, the housing including at least one guide part for guiding cutting fluid at a surface of the housing and at least one storage part for collecting cutting fluid guided by the guide part.

In a preferred embodiment, the surface is slanted with respect to a horizontal plane, and the at least one guide part is configured to guide the cutting fluid by the action of gravity.

In a preferred embodiment, in the housing, at least one storage part is given graduations so as to enable measurement of the cutting fluid collected at that storage part.

In a preferred embodiment, in the housing, the at least one storage part can be detached from the housing.

In a preferred embodiment, the housing is provided with pluralities of the guide parts and the storage parts.

In a preferred embodiment, there is provided a motor drive system comprising the above housing, an electronic component held in the housing, and a detecting part detecting the amount of cutting fluid collected at the at least one storage part.

In a preferred embodiment, the motor drive system further comprises an alarm part issuing an alarm signal when the amount of the cutting fluid stored at the at least one storage part exceeds a predetermined threshold value.

BRIEF DESCRIPTION OF THE DRAWINGS

These and other objects, features, and advantages of the present invention will become clearer by referring to the detailed description of illustrative embodiments of the present invention shown in the drawings.

DETAILED DESCRIPTION

Below, embodiments of the present invention will be explained with reference to the attached drawings. The component elements in the illustrated embodiments are suitably changed in scale for assisting understanding of the present invention. Further, the same or corresponding component elements use the same reference notations.

Figure 1:
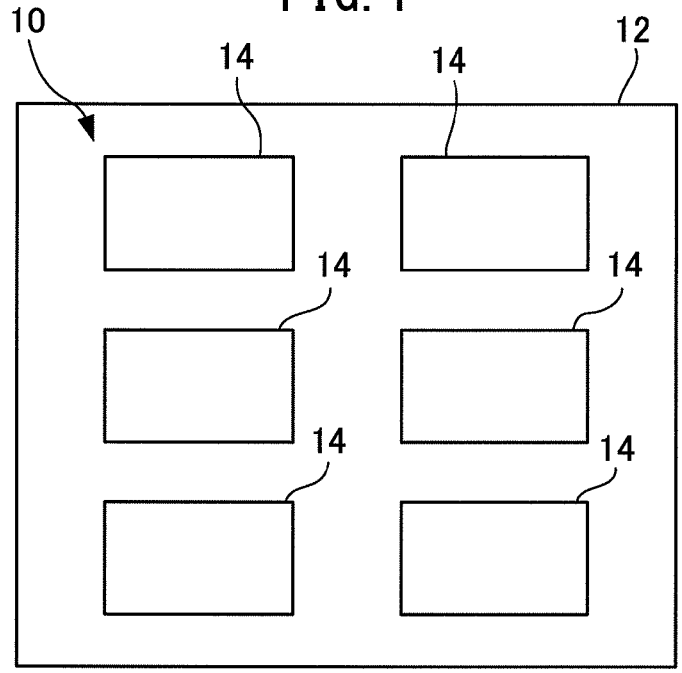
FIG. 1 is a conceptual view of a motor drive system.

FIG. 1 is a conceptual view showing a motor drive system 10. The motor drive system 10 includes a plurality of electronic components 14. The electronic components 14 include printed circuit boards and components mounted on the printed circuit boards and any other components. The electronic components 14 are housed in a control panel 12 having the form of a locker. The control panel 12 has an openable door and is configured to become accessible from the outside as needed. The control panel 12 forms an inside space generally sealed in the state where the door is closed.

The motor drive system 10 controls motors (not shown) used for driving shafts of a machine tool. When using a machine tool for machining work, a cutting fluid is used for the purposes of suppressing wear and cooling. The motor drive system 10 is used in an environment in which not only cutting fluid but also chips generated from the workpiece etc. fill the air. As explained above, the control panel 12 forms a sealed inside space, but cutting fluid sometimes enters the inside space from clearances at the door etc.

Therefore, the motor drive system 10 according to the present embodiment is configured to include a housing 20 for holding the electronic components 14 and preventing cutting fluid, dust, and other foreign matter from depositing on the electronic components 14.

Figure 2:
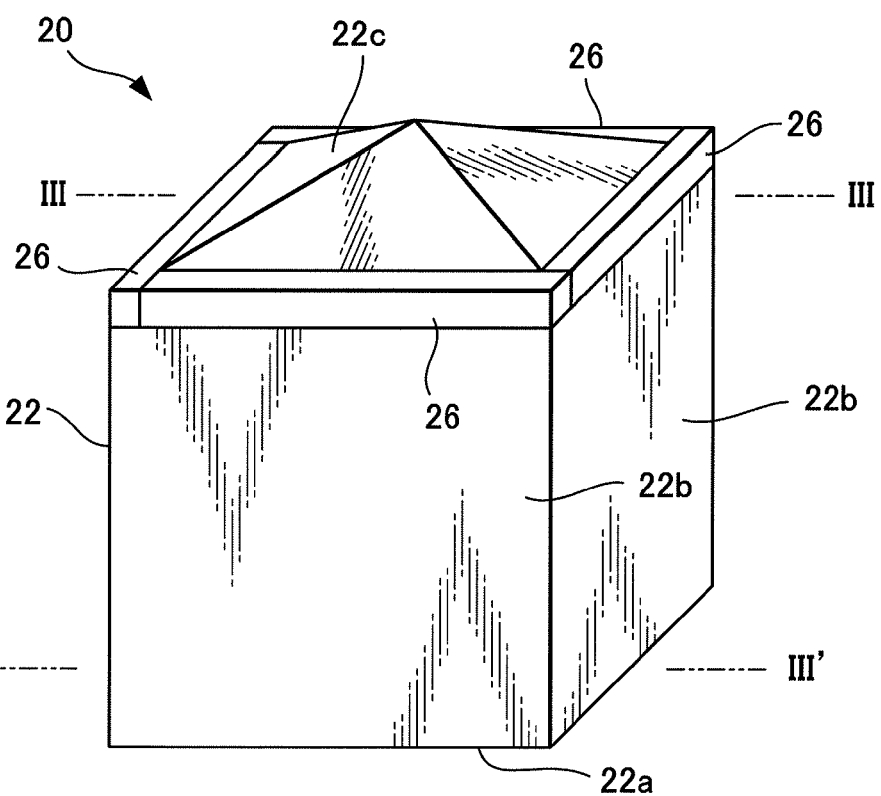
FIG. 2 is a perspective view of a housing holding electronic components of a motor drive apparatus according to one embodiment.
Figure 3:
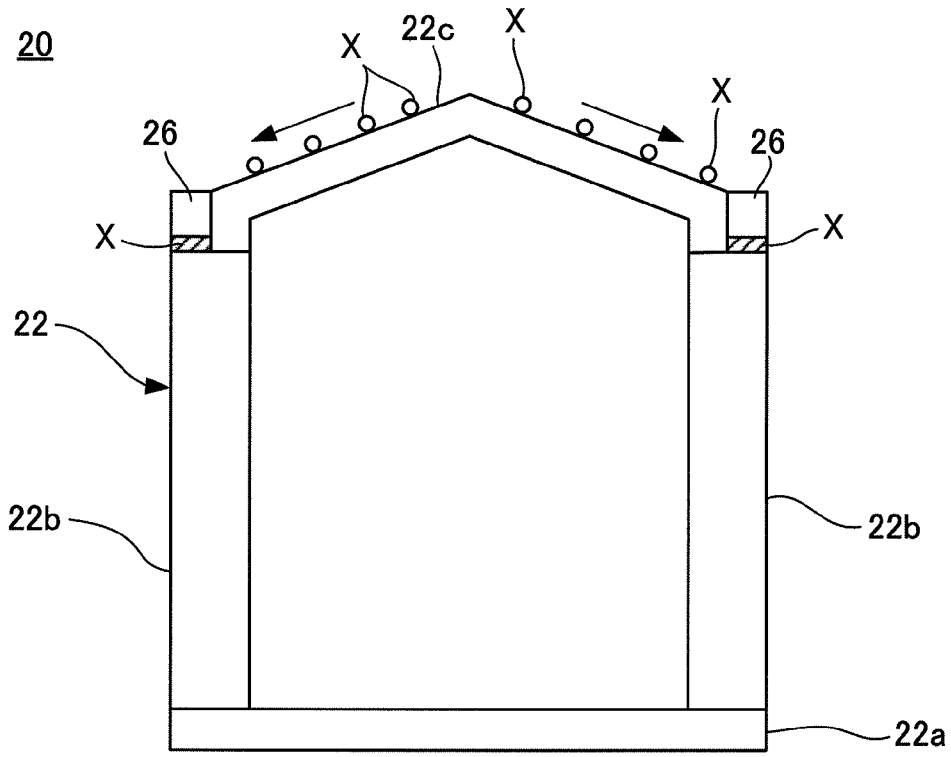
FIG. 3 is a cross-sectional view of the housing of FIG. 2 cut along the plane passing through the lines III,III'.

Referring to FIG. 2 and FIG. 3, the housing 20 for holding the electronic components 14 of the motor drive system 10 will be explained. FIG. 2 is a perspective view showing the housing 20, while FIG. 3 is a cross-sectional view of the housing 20 of FIG. 2 cut along the plane extending in the vertical direction passing through the line III and the line III'.

The housing 20 has a hollow body 22 having a generally box shape. The body 22 has a rectangular bottom 22a, side walls 22b extending upward in the vertical direction from the bottom 22a, and a top 22c closing an upwardly facing opening formed by the side walls 22b.

The top 22c has the shape of a four-sided pyramid extending upward. In other words, the faces of the top 22c are slanted so as to form predetermined angles with the horizontal plane.

The top 22c includes four storage parts 26 along its circumference. The storage parts 26 are box-shaped containers open facing upward. As will be clearly understood if referring to FIG. 3, there are no step differences between the storage parts 26 and the top 22c. These are connected to each other generally smoothly.

According to the housing having the above-mentioned configuration, cutting fluid dripping down to the top 22c of the housing 20 moves downward along the faces of the top 22c due to the action of gravity (see arrows of FIG. 3) and is collected at the storage parts 26. The hatched locations in FIG. 3 show the cutting fluid X in the storage parts 26.

In this way, according to the present embodiment, the slanted faces formed by the top 22c function as guide parts guiding the cutting fluid X to the storage parts 26. Due to this, an operator can visually determine the amount of cutting fluid C collected at the storage parts 26. Therefore, the operator can improve the air-tightness of the control panel 12 or change the location of installation of the motor drive system 10 as required to thereby take preventative measures to prevent trouble from occurring at the motor drive system 10.

Further, according to the motor drive system 10 according to the present embodiment, it is possible to prevent trouble in the motor drive system 10 due to deposition of the cutting fluid X, so it is possible to use a cooling fan motor. As a result, the freedom of thermal design is enhanced.

Further, since the storage parts 26 are provided at the sides of the top 22c of the housing 20, the operator can estimate the path of entry of cutting fluid X. Due to this, the operator can select effective measures for preventing the entry of cutting fluid X.

In one embodiment, the storage parts 26 may be formed with graduations. In this case, the operator can read the graduations of the storage parts 26 to thereby quantitatively measure the amounts of cutting fluid X in the storage parts 26.

In one embodiment, the storage parts 26 may be configured to be detachable from the housing 20. In that case, the operator can take out the storage parts 26 from the control panel 12, discard the cutting fluid X, and wash the storage parts 26, so the maintenance work becomes easy. Further, if a storage part 26 becomes damaged, it is possible to replace the storage part 26 at a low cost.

In the illustrated embodiment, four storage parts 26 are included around the top 22c. However, in another embodiment, three or less storage parts may also be formed. Alternatively, five or more storage parts may be formed.

In another embodiment, the housing may have a conical shape. In still another embodiment, the guide parts for guiding the cutting fluid to the storage parts may be grooves formed in the surface of the housing and extending at a slant with respect to the horizontal plane.

Figure 4:
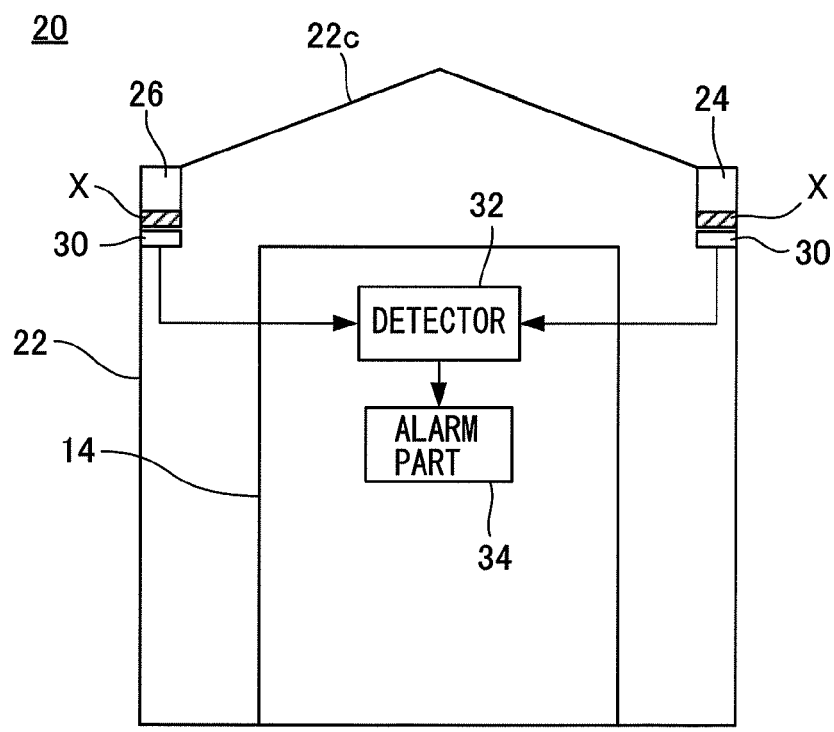
FIG. 4 is a view showing a housing according to another embodiment.

FIG. 4 shows a housing 20 according to another embodiment. In the present embodiment, the housing 20 is equipped with a weight detector 30. Further, the electronic components 14 include a detecting part 32 and an alarm part 34.

The weight detector 30 is configured to detect the weights of the storage parts 26 and in turn the weight of the cutting fluid X in the storage parts 26.

The detecting part 32 is configured to find the amount of cutting fluid X collected at the storage parts 26 from the output value of the weight detector 30.

The alarm part 34 is configured to emit an alarm signal when the amount of the cutting fluid X found by the detecting part 32 exceeds a predetermined threshold value. The motor drive system 10 sends a warning to the operator through sound, light, etc. in response to an alarm signal.

According to the present embodiment, an operator need not directly check the storage parts 26. The operator can be alerted when the amount of cutting fluid X collected at the storage parts 26 exceeds a predetermined amount. The operator can take measures as required upon receiving the warning, so trouble in the motor drive system 10 can be prevented.

In another embodiment, the motor drive system may be configured to use an optical detector instead of a weight detector 30 to obtain the amount of the cutting fluid X.

Above, various embodiments of the present invention were explained, but a person skilled in the art would recognize that other embodiments as well may be used to realize the actions and effects intended by the present invention. In particular, the component elements of the embodiments explained above can be deleted or replaced without departing from the scope of the present invention and known means can be further added. Further, the fact that the features of the plurality of embodiments which are explicitly or implicitly disclosed in this specification can also be freely combined so as to work the present invention is self evident to a person skilled in the art.

According to the housing and motor drive system including the housing according to the present invention, cutting fluid entering the inside of the control panel moves along the surface of the housing and is collected at the storage parts due to the action of the guide parts. Due to this, an operator can visually detect the entering cutting fluid and can be prompted to take preventative measures as required before trouble occurs at the motor drive system.

What is claimed is:

1. A housing holding electronic components of a motor drive system for driving a machine tool, the housing having a generally box shape with side walls extending upwardly in a vertical direction, the housing comprising:
    at least one guide part for guiding cutting fluid at a surface of the housing, the at least one guide part formed by a top closing an upwardly facing opening formed by the side walls, and
    at least one storage part located about a circumference of the top for collecting cutting fluid guided by the guide part.

2. The housing according to claim 1, wherein
    the surface is slanted with respect to a horizontal plane, and
    the at least one guide part is configured to guide the cutting fluid by the action of gravity.

3. The housing according to claim 1, wherein the at least one storage part is given graduations so as to enable measurement of the cutting fluid collected at that storage part.

4. The housing according to claim 1, where the at least one storage part can be detached from the housing.

5. The housing according to claim 1, wherein a plurality of the guide parts and a plurality of the storage parts are provided.

6. A motor drive system comprising:
a housing according to claim 1,
an electronic component held in the housing, and
a detecting part detecting the amount of the cutting fluid collected at the at least one storage part.

7. The motor drive system according to claim 6 further comprising an alarm part issuing an alarm signal when the amount of the cutting fluid stored at the at least one storage part exceeds a predetermined threshold value.

* * * * *